(12) United States Patent
DeCool

(10) Patent No.: US 9,261,359 B2
(45) Date of Patent: Feb. 16, 2016

(54) MEASURING HEAD OF A PNEUMATIC MEASURING DEVICE

(71) Applicant: HOMMEL-ETAMIC GmbH, Villingen-Schwenningen (DE)

(72) Inventor: Francois DeCool, Bayeux (FR)

(73) Assignee: JENOPTIK Industrial Metrology Germany GmbH, Villingen-Schwenningen (DE)

( * ) Notice: Subject to any disclaimer, the term of this patent is extended or adjusted under 35 U.S.C. 154(b) by 157 days.

(21) Appl. No.: 13/787,228

(22) Filed: Mar. 6, 2013

(65) Prior Publication Data

US 2013/0340504 A1 Dec. 26, 2013

(30) Foreign Application Priority Data

Mar. 7, 2012 (DE) .................. 10 2012 004 339

(51) Int. Cl.
*G01B 13/00* (2006.01)

(52) U.S. Cl.
CPC ...................... *G01B 13/00* (2013.01)

(58) Field of Classification Search
CPC ........................................ G01B 13/12
USPC ............................................. 73/37.5
See application file for complete search history.

(56) References Cited

U.S. PATENT DOCUMENTS

| | | | | |
|---|---|---|---|---|
| 1,940,921 A * | 12/1933 | Smith, Jr. | ............. | G01F 1/42 138/44 |
| 2,513,374 A * | 7/1950 | Stead | ............. | G01B 13/02 73/37.9 |
| 2,846,871 A * | 8/1958 | Worthen | ............. | G01B 13/10 73/37.9 |
| 3,774,645 A * | 11/1973 | Pompa | ............. | G01F 1/44 138/44 |
| 3,894,562 A * | 7/1975 | Moseley, Jr. | ............. | F16L 55/027 138/44 |
| 5,127,173 A * | 7/1992 | Thurston | ............. | G01F 1/3227 73/202 |
| 5,171,584 A * | 12/1992 | Ramsey | ............. | G01B 13/12 164/151 |
| 5,213,726 A * | 5/1993 | Ramsey | ............. | B22D 17/22 164/4.1 |
| 5,244,372 A * | 9/1993 | Ramsey | ............. | B22D 17/22 164/154.8 |
| 5,326,468 A * | 7/1994 | Cox | ............. | B01F 5/0646 138/45 |
| 6,647,808 B2 * | 11/2003 | Sato | ............. | B23Q 17/002 73/861.63 |
| 6,886,413 B1 * | 5/2005 | Chang | ............. | G01F 1/44 73/861.63 |
| 7,299,707 B1 * | 11/2007 | Evans | ............. | G01F 1/44 73/861.63 |
| 7,447,600 B2 * | 11/2008 | Wargo | ............. | G01F 1/363 702/50 |
| 2002/0178838 A1 * | 12/2002 | Sato | ............. | B23Q 17/002 73/861.63 |
| 2006/0162466 A1 * | 7/2006 | Wargo | ............. | G01F 1/363 73/861.63 |

FOREIGN PATENT DOCUMENTS

DE 102007028141 A1 * 12/2008 ........... F02M 15/027
DE 102007028141 B4 * 6/2009

* cited by examiner

*Primary Examiner* — Hezron E Williams
*Assistant Examiner* — Mark A Shabman
(74) *Attorney, Agent, or Firm* — Shlesinger Arkwright & Garvey LLP

(57) ABSTRACT

A measuring head of a pneumatic measuring device for measuring a workpiece has a base element in which a first flow channel is provided for connecting a compressed air source to a measuring nozzle. The first flow channel has a constricted area with at least one cross-sectional constriction. The measuring head also has one or more second flow channels for connecting the constricted area to a measuring transducer. The base element has a divided configuration in the axial direction. The divided configuration may be provided at least in the constricted area of the first flow channel.

6 Claims, 2 Drawing Sheets

MEASURING HEAD OF A PNEUMATIC MEASURING DEVICE

CROSS-REFERENCE TO RELATED APPLICATION

This application claims priority of German application no. 10 2012 004 339.2, filed Mar. 7, 2012, which is incorporated herein by reference.

FIELD OF THE INVENTION

The invention relates to a measuring head of a pneumatic measuring device for measuring a workpiece. More particularly, the invention relates to a measuring head of a measuring device for measuring a workpiece including a first flow channel having at least one cross-sectional constriction in a constricted area.

BACKGROUND OF THE INVENTION

Pneumatic measuring devices are generally known and are used, for example in dimensional measurement technology, for carrying out contactless measurements with a very high resolution of up to 0.1 µm, for example. In particular, pneumatic measuring devices may be used to perform static and/or dynamic measurements of geometric properties such as straightness, flatness, roundness, cylindrical shape, profile, angle, orthogonality, parallelism, position, concentricity, symmetry, and true running.

A measuring head of the type in question of a pneumatic measuring device for measuring a workpiece is known from U.S. Pat. No. 2,846,871, having a base element in which a first flow channel for connecting a compressed air source to a measuring nozzle is formed, the first flow channel having a constricted area with at least one cross-sectional constriction. The measuring head has a second flow channel for connecting the constricted area to a pressure transducer.

A similar measuring head is also known from U.S. Pat. No. 2,513,374.

A measuring device which operates according to the Venturi principle is known from U.S. Pat. No. 1,940,921.

A measuring head of a pneumatic measuring device for measuring a workpiece is known from DE 10223592 A1 (corresponding to U.S. Pat. No. 6,647,808 B2 and JP 002002 357410A), having a base element in which a first flow channel for connecting a compressed air source to a measuring nozzle is formed, the first flow channel having at least one cross-sectional constriction in a constricted area. The measuring head also has a second flow channel for connecting the constricted area to a measuring transducer.

An air nozzle in the form of a valve nozzle is known from DE 10 2007 028141 A1, which is configured as a substantially tubular component which is divided into a front, first section and a rear, second section with respect to the direction of an air flow, the second section being connected to the first section 8 via a constricted area 10 (narrowest cross section), and in addition the constricted area being connectable to a measuring apparatus via a flow channel, thus allowing the pressure prevailing in the constricted area to be reduced.

A pneumatic measuring device for detecting irregularities in the topography of surfaces of rotationally symmetrical components in particular is known from DE 20 2006 010164 U1, having a nozzle, provided in a housing. for generating a vortex-like gas flow which is directed from the nozzle opening onto the surface of the component to be investigated, and at least one acoustic detector or microphone for detecting the sound generated by the gas flow.

OBJECTS AND SUMMARY OF THE INVENTION

An object of the invention is to provide a measuring head of a pneumatic measuring device for measuring a workpiece which overcomes the drawbacks of the prior art.

More particularly, the invention relates to a measuring head of a measuring device for measuring a workpiece including a first flow channel having at least one cross-sectional constriction in a constricted area, which is easily manufacturable and makes possible high measuring accuracy.

This object is achieved by the invention including a measuring head of a pneumatic measuring device for measuring a workpiece, including a base element having an axial direction, and a first flow channel provided in the base element for connecting a compressed air source to a measuring nozzle, the first flow channel having at least one cross-sectional constriction in a constricted area. There is a second flow channel provided for connecting the constricted area to a pressure transducer. The base element has a divided configuration in the axial direction, and the divided configuration is at least in the constricted area.

A basic concept of the invention is that the measuring head is divided in the constricted area in the axial direction, thus forming a two-part or a multipart configuration. For example and in particular, according to the invention the constricted area may be configured in the manner of a Venturi nozzle, having a first cross-sectional area which narrows in the flow direction, resulting in a cross-sectional constriction having a substantially constant cross section in the flow direction, which is adjoined in the flow direction by a second cross-sectional area which expands in the flow direction.

As a result of the axial division of the base element in the constricted area, it is possible according to the invention to carry out the machining in the connecting area in a particularly accurate and meticulous manner during manufacture of the base element. Due to the axial division of the base element, on the one hand the material machining in the constricted area is simplified. On the other hand, burrs, for example, which form when boreholes are provided in the base element, are removed in a particularly simple manner. Undesirable turbulences in the air flow which could form at such burrs are thus reliably avoided.

Thus, the measuring head according to the invention is not only manufacturable in a simple and cost-effective manner, but also allows high measuring accuracy.

The constricted area of the measuring head according to the invention is preferably configured in the manner of a Venturi nozzle. However, it is also possible to configure the constricted area in some other way, for example in the manner of a diaphragm.

An extremely advantageous further embodiment of the invention which has independent inventive importance in combination with the features of the base element having an axial direction is the provision of a first flow channel provided in the base element for connecting a compressed air source to a measuring nozzle, the first flow channel having at least one cross-sectional constriction in a constricted area, and a second flow channel provided for connecting the constricted area to a pressure transducer. Further, the second flow channel communicates with the first flow channel via an annular space.

It has surprisingly been shown that the measurement noise of a pneumatic measuring device equipped with the measuring head according to the invention may thus be reduced. In comparison to a configuration in which the second flow channel or a plurality of second flow channels opens radially directly into the first flow channel, it has been found that the annular space has an averaging effect with regard to the measurement performance. In combination with the axial two-part or multipart configuration of the measuring head provided according to the invention, particularly advantageous properties result.

Due to the two-part or multipart configuration of the base element, the invention in particular allows particularly fine machining of the base element for forming at least one second flow channel and/or an annular space. The cross section of the, or each, second flow channel and of the annular space, respectively, may thus be kept small, which has a positive effect on the measuring characteristics of the measuring head, in particular the measurement noise and the response time when carrying out a measurement.

In this regard, a particularly advantageous further embodiment of the invention provides that the annular space is formed in the axial direction, between the parts of the measuring head. Thus, in this embodiment the axial parts define the annular space. In this way, on the one hand particularly meticulous machining of the parts of the base element adjoining the annular space is possible, so that material or machining imprecision which could influence the measurement performance may be largely avoided. On the other hand, on account of the above-described averaging effect of the annular space with regard to the measurement performance of the base element, the influence of any remaining material or machining imprecision on the measurement performance of the base element is further reduced. With particularly simple and thus cost-effective manufacturability, this results in particularly favorable measurement performance of the measuring head according to the invention.

According to the invention, the base element may have a two-part or multipart configuration, depending on the particular requirements.

For installation, the parts of the base element may be connected to one another in any desired manner.

An extremely advantageous further embodiment of the invention provides that the parts have a substantially complementary configuration with respect to one another at their mutually facing ends in the installed state, so that the parts may be fitted together. The installation of the base element is thus particularly simple.

Another advantageous further embodiment of the invention provides that one of the parts has a radial offset for forming a shoulder, and that the shoulder and the end of the other part facing the shoulder in the installed state define axial stop surfaces. In this embodiment, the stop surfaces abut one another in the installed state of the base element, whereby, for example and in particular, the annular space, via which the second flow channel is connected to the first flow channel, is formed at a distance from the stop surfaces in the axial direction.

According to the invention, a measuring nozzle may be formed directly on the measuring head. However, according to the invention it is also possible for the measuring nozzle to be situated at a distance from the measuring head and connected thereto via a line. According to the invention, a single measuring nozzle may be provided, depending on the particular measurement task. However, it is also possible to provide two or more measuring nozzles.

According to the invention, the constricted area may have a single cross-sectional constriction which in particular operates in the manner of a Venturi nozzle. However, according to the invention it is also possible to provide two or more cross-sectional constrictions in the first flow channel which once again may operate according to the principle of a Venturi nozzle.

According to the invention, it is sufficient in principle if only one second flow channel is provided. However, two or more flow channels may also be provided.

A pneumatic measuring device according to the invention for measuring a workpiece has at least one measuring head according to the invention for measuring a workpiece, which includes:

a) a base element having an axial direction;
b) a first flow channel provided in the base element for connecting a compressed air source to a measuring nozzle, the first flow channel having at least one cross-sectional constriction in a constricted area;
c) a second flow channel provided for connecting the constricted area to a pressure transducer; and
d) the base element having a divided configuration in the axial direction, the divided configuration being at least in the constricted area.

The measuring head may likewise include the base element having at least two parts, and one of the at least two parts has a radial offset for forming a shoulder, and the shoulder and an end of the other part facing the shoulder in the installed state define axial stop surfaces.

The invention is explained in greater below with reference to the appended drawings in which one embodiment of a measuring head according to the invention is illustrated. All features described, illustrated in the drawings, and claimed in the claims constitute the subject matter of the invention, alone or in any given technically meaningful combination, independently of their combination in the patent claims or dependencies, and independently of their description or illustration in the drawings, which show the following:

Relative terms such as left, right, up, and down are for convenience only and are not intended to be limiting.

DETAILED DESCRIPTION OF THE INVENTION

Figure 1:
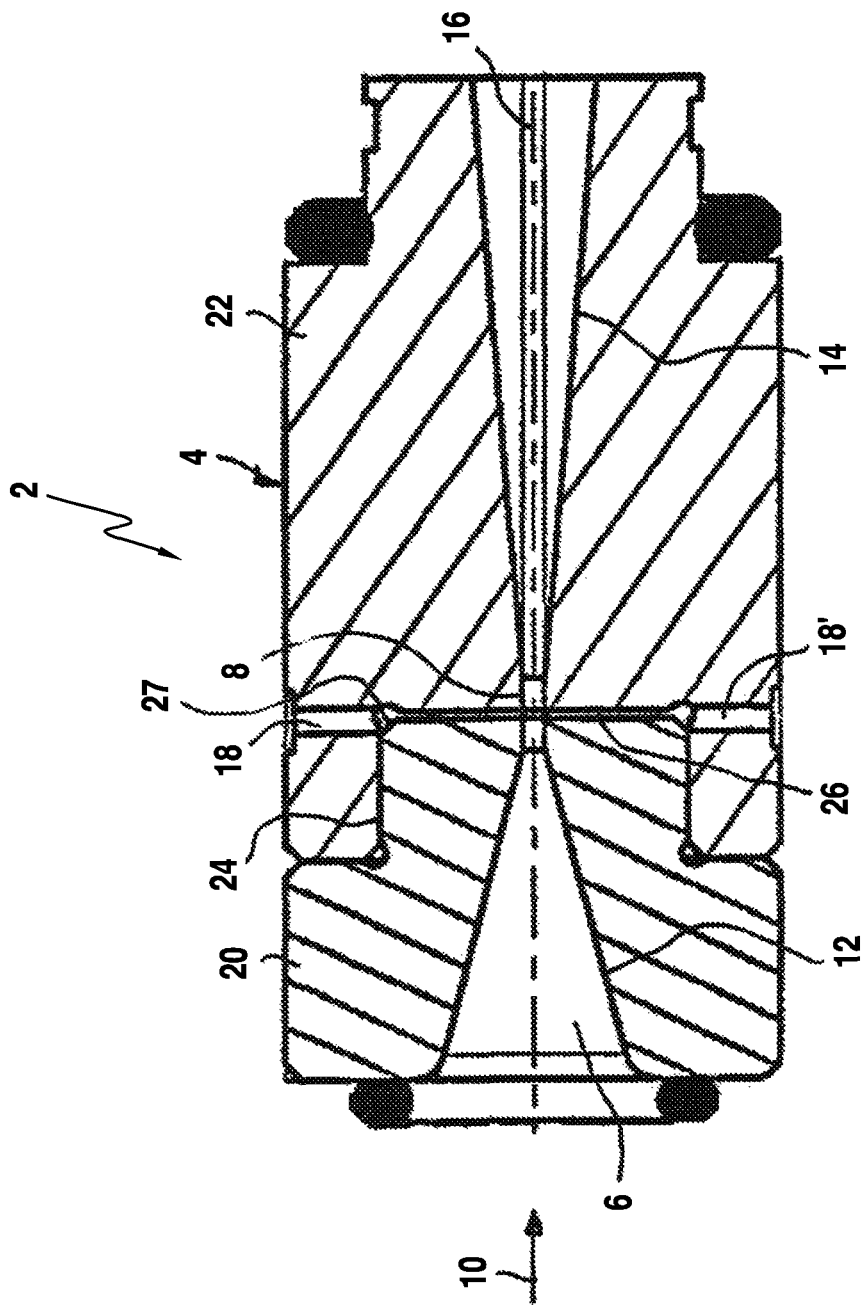
FIG. 1 shows a radial section of one embodiment of a measuring head according to the invention in the installed state.

FIG. 1 illustrates one embodiment of a measuring head 2 according to the invention of a pneumatic measuring device for measuring a workpiece, having a base element 4 in which a first flow channel 6 for connecting a measuring nozzle, which may be provided on the measuring head 2 or situated at a distance therefrom, to a compressed air source is formed.

The first flow channel 6 has a constricted area with a cross-sectional constriction 8 in the present embodiment. In the illustrated embodiment, the cross-sectional constriction 8 is configured in the manner of a Venturi nozzle. For this purpose, in the flow direction symbolized by an arrow 10 in FIG. 1, the first flow channel has in succession a first cross-sectional area 12 which narrows substantially conically in the flow direction 10, the cross-sectional constriction 8 which has a substantially constant cross section in the flow direction, and a second cross-sectional area 14 which expands substantially conically in the flow direction 10.

In the illustrated embodiment, the base element 4 is substantially rotationally symmetrical, the first flow channel 6 extending in the axial direction of the base element 4, and the flow axis coinciding with the rotational axis of symmetry 16 of the base element 4.

A second flow channel 18 for connecting the cross-sectional constriction 8 to a pressure transducer is also formed in the base element 4. As is apparent from FIG. 1, in addition to the second flow channel 18 a further second flow channel 18' is provided. It is not apparent from the drawing, and therefore explained here, that a total of four second flow channels 18, 18' are provided which extend around one another in the peripheral direction of the base element 4, offset by approximately 90° with respect to one another, and which in each case extend in the radial direction of the base element 4.

According to the invention, the base element 4 has a divided configuration in the axial direction in the area of the cross-sectional constriction 8, and in this embodiment has a first part 20 and a second part 22. As is apparent from FIG. 1, the parts 20, 22 in this embodiment have a substantially complementary design with respect to one another at their mutually facing ends in the installed state, so that the parts 20, 22 may be fitted together. For this purpose, the first part 20 has a radial offset for forming a shoulder 24, the shoulder 24 and the end of the second part 22 facing the shoulder 24 in the installed state illustrated in FIG. 1 defining axial stop surfaces.

In the illustrated embodiment, the second flow channels 18, 18' communicate with the first flow channel 6 via an annular space 26, the annular space 26 being formed in the axial direction between the first part 20 and the second part 22, and axially delimited by the parts 20, 22. It is apparent from the drawing that the annular space 26 has a cross-sectional expansion 27 at its radially outer end at which the annular space 26 is connected to the second flow channels 18, 18'. The cross-sectional expansion 27 is formed so that a circumferential bevel is radially outwardly formed at the end of the first part 20 at its axial end facing the second part 22, and in the radial direction an annular groove is formed on the second part 22, opposite from the bevel. Starting from the first flow channel 6, the annular space 26 thus has a first section with a constant or substantially constant cross section in the radial direction, the first section being adjoined in the radial direction by a second section between the first section and the second flow channels 18, 18', the second section having a cross section with respect to the first section which expands radially outwardly toward the second flow channels 18, 18'.

Figure 2:
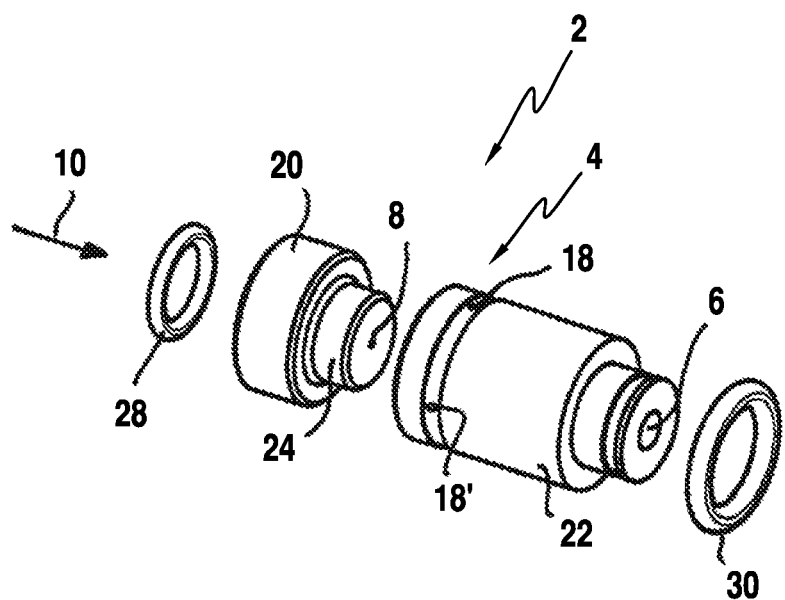
FIG. 2 shows the measuring head according to FIG. 1 in a perspective exploded illustration.

FIG. 2 shows a perspective exploded illustration of the measuring head 2; seals denoted by reference numerals 28, 30 respectively provide a seal when the first part 20 is connected to a compressed air source, and provide a seal of the second part 22 to a measuring head.

The mode of operation of the measuring head 2 according to the invention is as follows:

During operation, compressed air flows in the flow direction 10 through the first flow channel 6 to a measuring nozzle. In this regard, the cross-sectional constriction 8 acts in the manner of a Venturi nozzle. For example, the differential pressure between the first flow channel 6 and the second flow channels 18, 18' may be measured. If the measuring nozzle is brought into interaction with a workpiece to be measured, the pressure in the second flow channels 18, 18' changes, and therefore the differential pressure changes. By means of a suitable measuring transducer, this pressure signal or differential pressure signal may be converted into a measuring signal, which results in a measured value during the measurement of the workpiece. The manner in which measurement is performed by means of a pneumatic measuring process in dimensional measurement technology, using the Venturi principle, is known to those skilled in the art and therefore is not explained in greater detail herein.

As a result of the base element 4 having an axial two-part or multipart configuration according to the invention, the machining of the measuring head, for example for forming the first flow channel 6, and of the second flow channels 18, 18', and of the annular space 26 is particularly simple and possible with high precision. In particular on account of the base element having multiple axial parts provided according to the invention, keeping the cross section of the second flow channels 18, 18' and of the annular space 26 small is simplified. Thus, the measuring head according to the invention is not only manufacturable in a particularly simple and cost-effective manner, but also has favorable measurement performance, in particular with regard to low measurement noise and a short response time.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Measuring head of a dimensional pneumatic workpiece measuring device for dimensional measuring of a workpiece, comprising:
    a) a base element having an axial direction;
    b) a first flow channel provided in the base element for connecting a compressed air source to a measuring nozzle, the first flow channel having at least one cross-sectional constriction in a constricted area;
    c) a second flow channel provided in the base element for connecting the constricted area to a pressure transducer;
    d) the base element having a divided configuration in the axial direction, the divided configuration being at least in the constricted area;
    e) an annular space being provided; and
    f) the second flow channel communicates with the first flow channel via the annular space; and
    g) the base element having a first part and a second part, and the annular space is formed in the axial direction, between the first part and the second part.

2. Measuring head according to claim 1, wherein:
    a) the first part and the second part have a substantially complementary configuration with respect to one another at their mutually facing ends, so that the first part and the second part may be fitted together.

3. Measuring head according to claim 2, wherein:
    a) one of the first part and the second part has a radial offset for forming a shoulder, and the shoulder and an end of the other one of the first part and the second part facing the shoulder in the installed state define axial stop surfaces.

4. Pneumatic measuring device for measuring a workpiece, wherein:
    a) the pneumatic measuring device has at least one measuring head according to claim 3.

5. Measuring head according to claim 1, wherein:
    a) one of the first part and the second part has a radial offset for forming a shoulder, and the shoulder and an end of other one of the first part and the second part facing the shoulder in the installed state define axial stop surfaces.

6. Pneumatic measuring device for measuring a workpiece, wherein:
    a) the pneumatic measuring device has at least one measuring head according to claim 1.

\* \* \* \* \*